(12) United States Patent
Tsuchida et al.

(10) Patent No.: US 6,647,268 B1
(45) Date of Patent: Nov. 11, 2003

(54) MOBILE UNIT COMMUNICATION APPARATUS

(75) Inventors: Hirotatsu Tsuchida, Saitama (JP); Ken Asami, Saitama (JP); Masashi Satomura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 394 days.

(21) Appl. No.: 09/591,486

(22) Filed: Jun. 12, 2000

(30) Foreign Application Priority Data

Jun. 16, 1999 (JP) .......................................... 11-169918

(51) Int. Cl.7 ............................. H04Q 7/20; H04B 7/00
(52) U.S. Cl. ....................... 455/456; 455/518; 455/455; 340/988; 342/140; 701/301
(58) Field of Search ................................ 455/455, 456, 455/457, 518, 526, 403, 456.1, 456.3, 456.4, 456.5, 414.2, 422.1, 39; 342/118, 140, 142, 143, 147; 701/300, 301, 4, 70, 207, 213, 216; 340/825.49, 988, 436

(56) References Cited

U.S. PATENT DOCUMENTS 5,502,758 A * 3/1996 Tsuzuki et al. ............. 342/450
5,873,041 A * 2/1999 Ishii ........................... 342/359

FOREIGN PATENT DOCUMENTS

| JP | 358223015 A | * 12/1983 | .................. 701/207 |
| JP | 5-266399 | 10/1993 | |
| JP | 10293899 | * 11/1998 | ............ G08G/1/09 |
| JP | 11144185 | * 5/1999 | ............ G08G/1/00 |
| JP | 02000348299 | * 12/2000 | ............ G08G/1/16 |

* cited by examiner

Primary Examiner—Nay Maung
Assistant Examiner—Edan Orgad
(74) Attorney, Agent, or Firm—Arent Fox Kintner Plotkin & Kahn

(57) ABSTRACT

The object of the invention is to provide a mobile unit communication apparatus that can also efficiently acquire required information from another mobile unit in a place where multiple mobile units gather. To achieve the object, an identification code corresponding to a traveling azimuth of a mobile unit where a mobile unit communication apparatus is mounted is added to an information signal to be transmitted and the information signal is transmitted, an incoming information signal transmitted from another mobile unit is received and the information signal from another mobile unit is processed according to a traveling azimuth shown by an identification code added to the received information signal from another mobile unit.

13 Claims, 4 Drawing Sheets

MOBILE UNIT COMMUNICATION APPARATUS

BACKGROUND OF THE INVENTION

1. Field of the Invention

The present invention relates to a mobile unit communication apparatus for communicating between mobile units such as a vehicle.

2. Description of the Related Art

A communication device for communicating with another traveling vehicle during traveling and exchanging the information such as a traveling state of the vehicles is already disclosed in Japanese Patent Unexamined Publication No. Hei. 5-266399(JP-A-5-266399) for example. Such a conventional type communication device is provided with a radio communication device, transmits a radio signal including an information signal of a vehicle where the radio communication device is mounted by the radio communication device, receives an information signal related to another vehicle by the radio communication device, analyzes the received information signal related to another vehicle and informs the driver and others of the vehicle of information required for the traveling of the vehicle.

However, as an information signal of an own vehicle is individually transmitted from multiple vehicles in a place where multiple vehicles gather such as an intersection in case such a conventional type inter-vehicle communication device is used in each vehicle, a communication device in each vehicle is required to process all received information signals, the quantity of processing for analysis is increased and efficient processing is disabled. That is, there is a problem that it may take much time until a communication device in each vehicle acquires information required to secure safe traveling, for example the information of an opposite vehicle.

This is not limited to a vehicle and is also similar in a mobile unit such as shipping.

SUMMARY OF THE INVENTION

The object of the invention is to provide a mobile unit communication apparatus that can also efficiently acquire required information from another mobile unit in a place where multiple mobile units gather.

A mobile unit communication apparatus according to the invention is a mobile unit communication apparatus mounted in a mobile unit for transmitting and receiving an information signal and is characterized in that azimuth detecting means for detecting the traveling azimuth of a mobile unit, transmitting means for adding an identification code corresponding to the traveling azimuth detected by the azimuth detecting means to an information signal to be transmitted and transmitting it, receiving means for receiving an incoming information signal and information processing means for processing the incoming information signal according to the traveling azimuth shown by the identification code added to the incoming information signal received by the receiving means are provided.

An incoming information signal means an information signal transmitted from another mobile unit and incoming to receiving means.

According to the invention, as an identification code corresponding to the traveling azimuth of a mobile unit where a mobile unit communication apparatus is mounted is added to an information signal to be transmitted and the information signal is transmitted, an incoming information signal transmitted from another mobile unit is received and the information signal from another mobile unit is processed according to the traveling azimuth shown by an identification code added to the received information signal from another mobile unit, all information signals from any other mobile unit in a place where multiple mobile units gather are not required to be processed and information required to secure safe traveling can be efficiently acquired in a short time.

As the information processing means is provided with decision means for deciding that a traveling azimuth shown by an identification code added to an incoming information signal received by receiving means and a traveling azimuth detected by azimuth detecting means are opposite and processing for extracting information from the incoming information signal only when it is detected by the decision means that both traveling azimuths are opposite is executed, only an information signal from another mobile unit traveling opposite can be easily acquired.

Also, a mobile unit communication apparatus according to the invention is a mobile unit communication apparatus mounted in a mobile unit for transmitting and receiving an information signal and is characterized in that azimuth detecting means for detecting the traveling azimuth of a mobile unit, transmitting means for transmitting an information signal to be transmitted via a channel corresponding to a traveling azimuth and receiving means for receiving an incoming information signal via a channel corresponding to an azimuth different from a traveling azimuth are provided.

According to the invention, as an information signal to be transmitted is transmitted via a channel corresponding to the traveling azimuth of a mobile unit where a mobile unit communication apparatus is mounted and an information signal from another mobile unit incoming via a channel corresponding to an azimuth different from the traveling azimuth is received, all information signals from any other mobile unit in a place where multiple mobile units gather are not required to be received and processed and information required to secure safe traveling can be efficiently acquired in a short time.

DETAILED DESCRIPTION OF THE PREFERED EMBODIMENT

Figure 1:
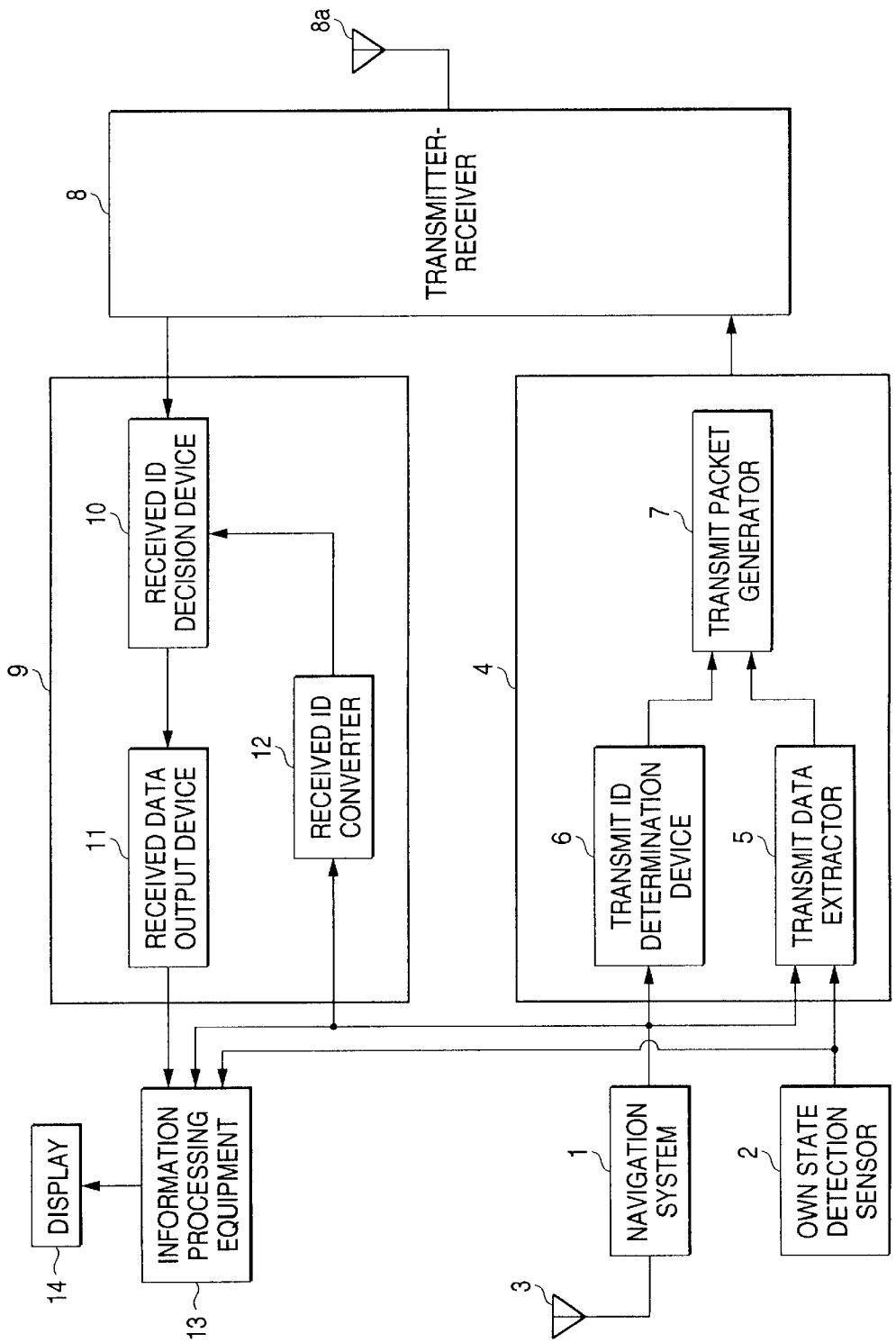
FIG. 1 is a block diagram showing an inter-vehicle radio communication apparatus according to the invention.

Referring to the drawings, an embodiment of the invention will be described in detail below.

FIG. 1 shows an inter-vehicle radio communication device according to the invention. The inter-vehicle communication device is provided with a navigation system 1 as an own information detector and an own state detection sensor 2.

The navigation system 1 includes a global positioning system (GPS) connected to an antenna 3, receives a radio wave transmitted from an artificial satellite via a GPS antenna 3, operates and detects own position data including a current own position and a traveling azimuth based upon a received signal.

Though the own state detection sensor 2 is not shown, it includes a speed sensor for detecting the speed of a vehicle, an acceleration sensor for detecting the acceleration of a vehicle, a brake switch for detecting the operation of a brake, a direction indicator switch for detecting the direction indication operation of a vehicle, a steering sensor for detecting the quantity of steering, a yaw rate sensor for detecting the change of the azimuth of a vehicle, a shift position sensor for detecting the shift position of a transmission mounted in a vehicle and a throttle aperture sensor for detecting the aperture of the throttle valve of a vehicle. Own state data detected by these sensors is output from the own state detection sensor 2.

A transmit information deciding section 4 is connected to each output terminal of the navigation system 1 and the own state detection sensor 2. The transmit information deciding section 4 includes a transmit data extractor 5, a transmit ID determination device 6 and a transmit packet generator 7. The transmit data extractor 5 extracts and holds each own data composed of own position data and own state data respectively detected by the navigation system 1 and the own state detection sensor 2. The transmit ID determination device 6 receives own position data including an own position and a traveling azimuth from the navigation system 1 and sets vehicle ID (an identification code) according to the own position data. The transmit packet generator 7 generates an own packet (an information signal) to be transmitted using own data held by the transmit data extractor 5 and vehicle ID set by the transmit ID determination device 6 and supplies the packet to a transmitter-receiver 8.

The transmitter-receiver 8 modulates a radio signal including the own packet, transmits it via an antenna 8a, receives a radio signal including a packet from another vehicle via the antenna 8a, demodulates the radio signal and outputs the packet from another vehicle. A packet from another vehicle received by the transmitter-receiver 8 means an incoming information signal.

A received information deciding section 9 is connected to the output terminal of the transmitter-receiver 8 and a received packet from another vehicle is output to the received information deciding section 9. The received information deciding section 9 includes a received ID decision device 10, a receive data output device 11 and a received ID converter 12. The received ID converter 12 receives traveling azimuth data from the navigation system 1 and outputs an ID selection signal showing vehicle ID defined as an azimuth reverse to the traveling azimuth to the received ID decision device 10. The received ID decision device 10 extracts only the data of the vehicle ID shown by the ID selection signal related to the received packet from another vehicle and outputs it to the receive data output device 11. That is, the received ID decision device 10 extracts only the data of a packet transmitted from an opposite vehicle. The receive data output device 11 holds and outputs each data output from the received ID decision device 10. The output of the receive data output device 11 is equivalent to the output of the received information deciding section 9.

Information processing equipment 13 is connected to the output terminal of the received information deciding section 9. The information processing equipment 13 is also connected to each output terminal of the navigation system 1 and the own state detection sensor 2. The information processing equipment 13 decides information required for traveling according to own data acquired from the navigation system 1 and the own state detection sensor 2 and opposite vehicle data acquired from the received information deciding section 9 and instructs a display 14 to display the information.

The navigation system 1 is equivalent to the azimuth detecting means, the transmit information deciding section 4 and the transmitter-receiver 8 are equivalent to the transmitting means, and the received information deciding section 9 and the transmitter-receiver 8 are equivalent to the receiving means. Also, the information processing equipment 13 is equivalent to the information processing means.

Figure 2:
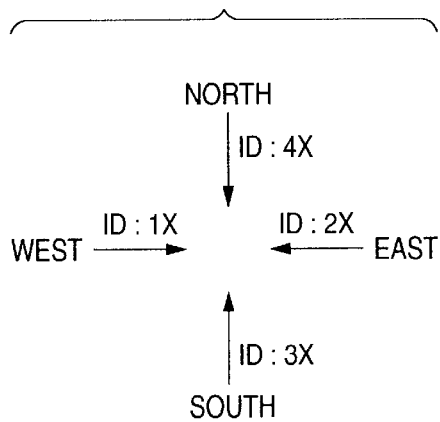
FIG. 2 is a view of illustrating a method of determining vehicle ID according to an azimuth.

In the inter-vehicle radio communication device having such configuration, the vehicle ID of a vehicle traveling east is defined as 1X as shown in FIG. 2, the vehicle ID of a vehicle traveling west is defined as 2X, the vehicle ID of a vehicle traveling north is defined as 3X and the vehicle ID of a vehicle traveling south is defined as 4X. The vehicle ID of a vehicle traveling to a direction other than the directions is defined as 8X. "X" means a code for specifying each vehicle, however, it may be also a code for specifying vehicles traveling to the same direction.

Figure 3:
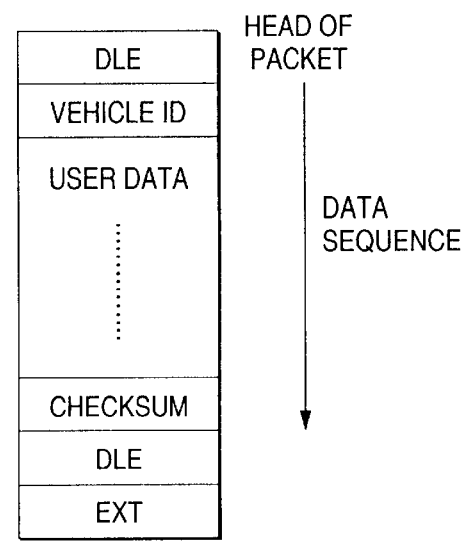
FIG. 3 is a view of illustrating the data format of a packet.
Figure 4:
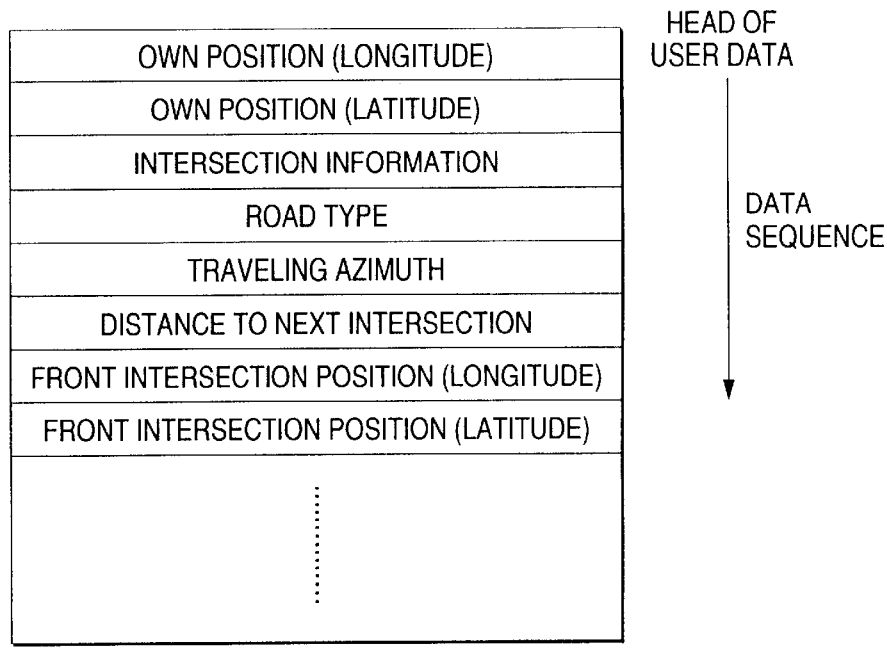
FIG. 4 is a shows the data format of user data in the packet shown in FIG. 3.

The data format of a transmitted packet is composed of DLE, vehicle ID (mobile unit ID), user data, a checksum, DLE and EXT as shown in FIG. 3. The former DLE shows the start of data included in the packet and the latter DLE shows the end of the data included in the packet. EXT shows a delimiter in the packet. User data means own data as shown in FIG. 4.

Figure 5:
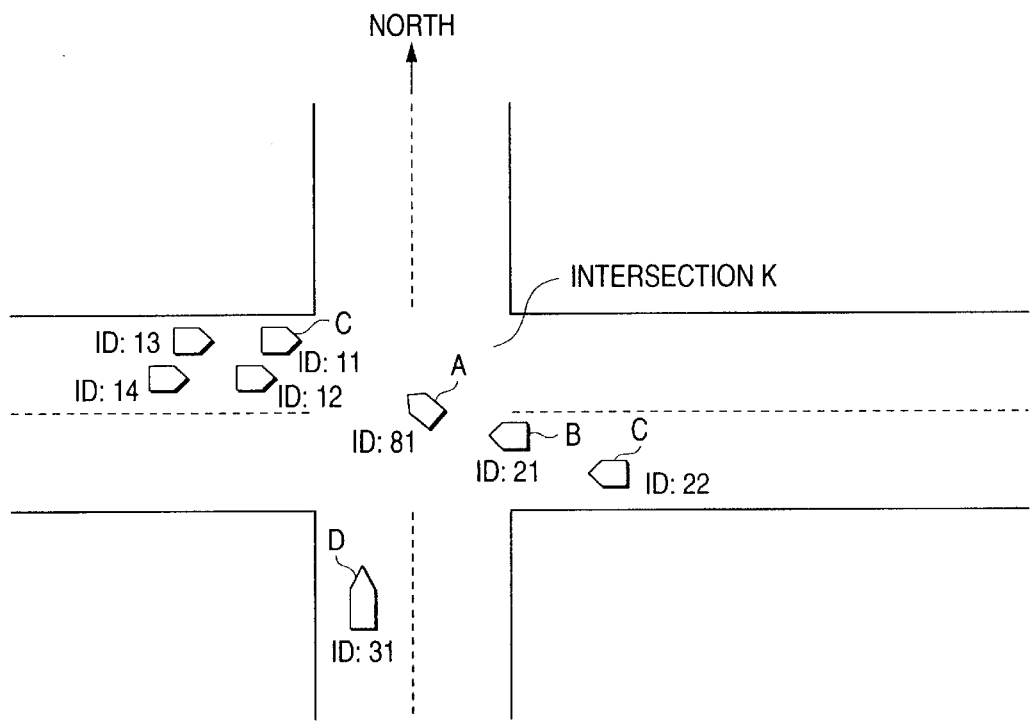
FIG. 5 is a drawing for explaining an example of the operations of vehicles traveling, mounting the device shown in FIG. 1.

FIG. 5 shows an example of the allocation of vehicle ID in case a vehicle where such inter-vehicle radio communication device is mounted travels in an intersection K. An own vehicle G is traveling east and is currently located before the intersection K. Vehicle ID of 11 is allocated to the own vehicle G as described later and vehicle IDs of 12 to 14 are allocated to vehicles traveling in the same direction around the own vehicle G. Vehicle IDs 21 and 22 are allocated to vehicles B and C traveling west opposite to the own vehicle G. Vehicle ID of 81 is allocated to a vehicle A turning to the right in the intersection K. Vehicle ID of 31 is allocated to a vehicle D traveling from the right of the intersection K when viewed from the own vehicle G to the north.

In the (user's) own vehicle G, as an own azimuth detected by the navigation system 1 is the east, own azimuth data showing the east is supplied to the transmit ID determination device 6. The transmit ID determination device 6 determines vehicle ID of 1X based upon the own azimuth data and as the own vehicle G is at the top before the intersection K, its "X" is set to 1. Vehicle ID determined as described above is supplied to the transmit packet generator 7. As the transmit data extractor 5 extracts and holds each own data detected by the navigation system 1 and the own state detection sensor 2, the transmit packet generator 7 generates an own packet to be transmitted using own data held by the transmit data extractor 5 and vehicle ID set by the transmit ID determination device 6. The transmitter-receiver 8 modulates a radio signal using the own packet and transmits it via the antenna 8a.

Also, in the own vehicle G, the received ID converter 12 outputs an ID selection signal showing vehicle ID of 2X to the received ID decision device 10 based upon own azimuth data from the navigation system 1. That is, as the vehicle ID of the own vehicle G is 1X corresponding to the east which is the azimuth of the own vehicle and the azimuth of the opposite vehicle of the own vehicle G is the west, an ID selection signal showing 2X is generated.

Figure 6:
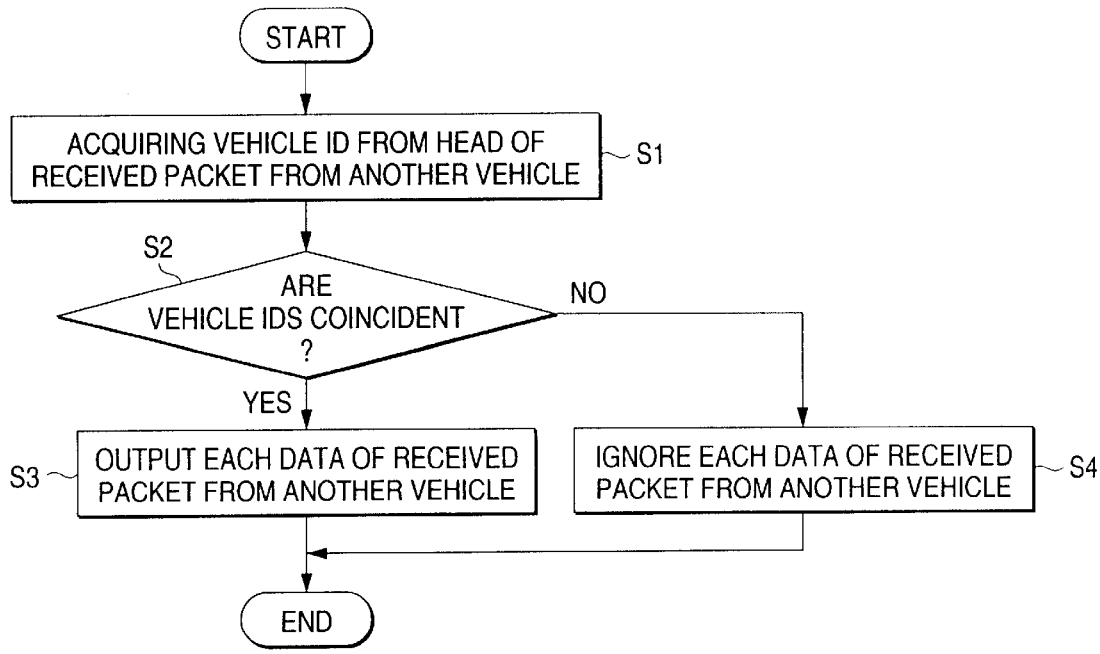
FIG. 6 is a flowchart showing the operation of a received ID decision device.

In the meantime, a radio signal including a packet from another vehicle is received by the transmitter-receiver 8 via the antenna 8a and the transmitter-receiver 8 outputs the packet from another vehicle to the received ID decision device 10. The received ID decision device 10 acquires vehicle ID from the head of the packet from another vehicle (a step S1) and decides whether the vehicle ID is coincident with vehicle ID shown by the ID selection signal or not (a step S2) as shown in FIG. 6. In case they are coincident, the received ID decision device 10 outputs the packet from another vehicle to the receive data output device 11 (a step S3) and in case they are not coincident, the received ID decision device ignores the packet from another vehicle (a step S4). In the step S2, it is decided whether vehicle ID shown by an ID selection signal is opposite to vehicle ID of the own vehicle or not as s result.

As a packet from another vehicle is transmitted from the vehicle B or C in case vehicle ID acquired from the head of the packet from another vehicle is 2X, the packet from another vehicle having the vehicle ID of 2X is supplied to the receive data output device 11 and the information processing equipment 13 reads each data from the packet from another vehicle. In case the information processing equipment 13 decides that the vehicle B or C is turning to the right in the intersection K based upon opposite vehicle data of the vehicle B or C from the receive data output device 11, it instructs the display 14 to display the information.

In the embodiment, only packets from another vehicles transmitted from the opposite vehicles B and C of the own vehicle G are extracted, however, a extracted packet is not necessarily limited to packets from opposite vehicles. The received ID decision device 10 may also output packets from the vehicle A turning to the right and the vehicle D traveling straight from the right which may be dangerous to the own vehicle G in the intersection K to the receive data output device 11. That is, the received ID converter 12 outputs an ID selection signal showing vehicle IDs of 2X, 3X and 8X based upon own azimuth data from the navigation system 1 to the received ID decision device 10 and the received ID decision device 10 outputs a packet from another vehicle having vehicle ID of 2X, 3X or 8X at the head to the receive data output device 11.

Further, the transmit ID determination device 6 may also set vehicle ID according to a vector indicated by the direction indicator of a vehicle. For example, in the case of the vehicle A shown in FIG. 5, the azimuth is not completely the north, however, as it is estimated to the own vehicle that respective traveling routes will cross, vehicle ID of the vehicle A is changed to 3X when turning to the right is indicated by the direction indicator.

In the embodiment, vehicle ID differs in four azimuths of the east, the west, the south and the north, however, vehicle ID may also differ in eight azimuths including the northwest, the northeast, the southeast and the southwest.

Figure 7:
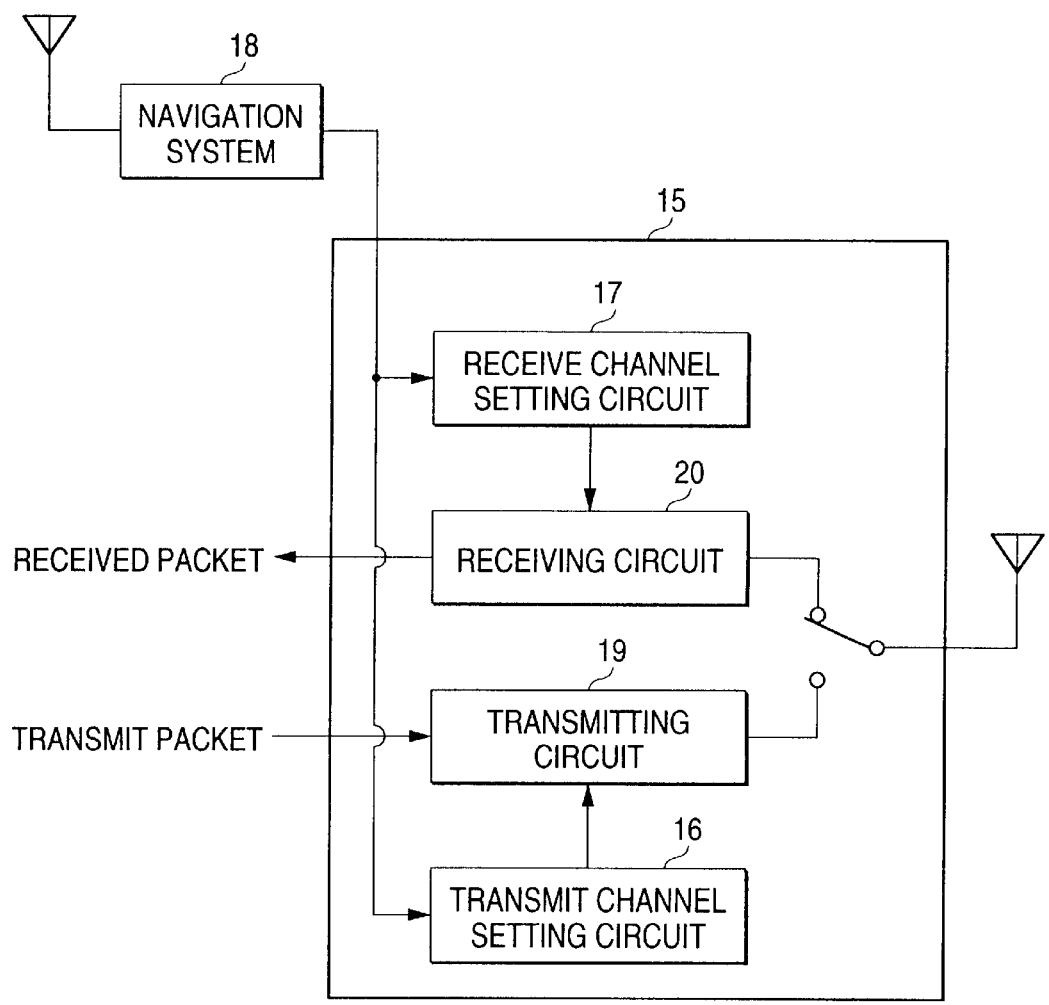
FIG. 7 is a block diagram showing an inter-vehicle radio communication device according to the invention.

Also, in the embodiment, vehicle ID of the own vehicle is changed according to a traveling azimuth, however, a transmit frequency (a transmit channel) may be also changed. In this case, in the own vehicle, the receive frequency (the receive channel) of the transmitter-receiver is tuned to the transmit frequency of the opposite vehicle. For example, as shown in FIG. 7, a transmitter-receiver 15 is provided with a transmit channel setting circuit 16 for setting a transmit channel, a receive channel setting circuit 17 for setting a receive channel, a transmitting circuit 19 for transmitting an own packet as a radio signal via the set transmit channel and a receiving circuit 20 for receiving a radio signal having a packet from another vehicle via the set receive channel. In the case of the communication device, a communication channel is predetermined every traveling azimuth of the east, the west, the south and the north, the transmit channel setting circuit 16 sets a communication channel corresponding to a traveling azimuth shown by own azimuth data from a navigation system 18 as a transmit channel and the receive channel setting circuit 17 sets a communication channel corresponding to an azimuth opposite to the traveling azimuth shown by the own azimuth data from the navigation system 18 as a receive channel.

Further, in case a spread spectrum (SS) system is used for a modulation system of a transmitter-receiver 8, a spreading key can be also switched according to a traveling azimuth of a vehicle.

The invention can be applied to not only the vehicles which pass the left side of a road, but also the vehicles which pass the right side of one.

Further, in the embodiment, the inter-vehicle radio communication device is described as a mobile unit communication apparatus, however, the invention is not limited to a vehicle and can be also applied to another mobile unit such as shipping.

As described above, according to the invention, an identification code corresponding to a traveling azimuth of a mobile unit where the mobile unit communication apparatus is mounted is added to an information signal to be transmitted and the information signal is transmitted, an incoming information signal transmitted from another mobile unit is received and the information signal from another mobile unit is processed according to a traveling azimuth shown by an identification code added to the received information signal from another mobile unit.

Also, according to the invention, an information signal to be transmitted is transmitted via a channel corresponding to a traveling azimuth of a mobile unit where the mobile unit communication apparatus is mounted and an information signal from another mobile unit incoming via a channel corresponding to an azimuth different from the traveling azimuth is received.

Therefore, all information signals from any other mobile unit in a place where multiple mobile units gather are not required to be processed and information required to secure safe traveling can be efficiently acquired in a short time.

What is claimed is:

1. A mobile unit communication apparatus mounted in a mobile unit for transmitting and receiving an information signal comprising:

azimuth detecting means for detecting a traveling azimuth of said mobile unit;

transmitting means for adding an identification code corresponding to said traveling azimuth to said information signal to be transmitted and transmitting said information signal;

receiving means for receiving an incoming information signal from other mobile units; and information processing means for processing said incoming information signal, wherein said incoming information signal is processed according to a traveling azimuth shown by said identification code added to said incoming information signal received by said receiving means.

2. The mobile unit communication apparatus according to claim 1, wherein said information processing means for deciding whether or not both a traveling azimuth shown by an identification code added to said incoming information signal received by said receiving means and a traveling azimuth detected by said azimuth detecting means are opposite; and wherein when both azimuths are opposite, said incoming information signal is read, wherein when both azimuths are not opposite, said incoming information signal is ignored.

3. The mobile unit communication apparatus according to claim 1, wherein said azimuth detecting means detects the current traveling azimuth of said mobile unit or the traveling azimuth of said mobile unit in immediate future.

4. The mobile unit communication apparatus according to claim 1, comprising:

a received information deciding section for receiving an incoming information signal from other mobile units; and processing said incoming information signal, wherein said incoming information signal is processed according to a traveling azimuth shown by said identification code added to said incoming information signal.

5. The mobile unit communication apparatus according to claim 4, wherein said received information deciding section comprising:

a received ID decision device;

a receive data output device for holding and outputting each data output from said received ID decision device; and a received ID converter for receiving traveling azimuth data from said navigation system, wherein said received ID converter outputs an ID selection signal to said received ID decision device, wherein said selection signal shows mobile unit ID defined based on said traveling azimuth data.

6. The mobile unit communication apparatus according to claim 5, wherein said a received ID decision device extracts only the data of mobile unit ID corresponding to said ID selection signal.

7. The mobile unit communication apparatus according to claim 1, installed in a vehicle.

8. The mobile unit communication apparatus according to claim 1, wherein said information signal is formed in the form of a packet.

9. A mobile unit communication apparatus mounted in a mobile unit for transmitting and receiving an information signal comprising:

azimuth detecting means for detecting the traveling azimuth of said mobile unit;

means for transmitting an information signal to be transmitted via a channel corresponding to said traveling azimuth; and receiving means for receiving an incoming information signal via a channel corresponding to an azimuth different from said traveling azimuth.

10. The mobile unit communication apparatus according to claim 9, comprising:

a transmit channel setting circuit for setting for setting a transmit channel;

a receive channel setting circuit for setting a receive channel;

a transmitting circuit for transmitting an own packet via said transmit channel; and a receiving circuit for receiving a packet from another mobile unit via said receive channel, wherein said transmit channel and said receiving channel are respectively predetermined on every traveling azimuth wherein said transmit channel setting circuit sets said transmit channel according to a traveling azimuth of own mobile unit, wherein said receive channel setting circuit sets a receive channel which is channel corresponding to a traveling azimuth being opposite to a own traveling azimuth.

11. A method for transmitting and receiving an information signal of mobile unit comprising a step of;

detecting a traveling azimuth of said mobile unit;

adding an identification code corresponding to said traveling azimuth detected by said step of detecting to an information signal to be transmitted and transmitting said information signal;

receiving an incoming information signal; and processing said incoming information signal according to a traveling azimuth shown by said identification code added to said incoming information signal received by said step of receiving.

12. The method for transmitting and receiving an information signal of mobile unit according to claim 11, wherein said step of processing comprising a step of;

deciding that a traveling azimuth shown by an identification code added to said incoming information signal received by said step of receiving and a traveling azimuth detected by said step of detecting are opposite;

wherein information extracting processing for said incoming information signal is executed only when it is detected by said decision means that both azimuths are opposite.

13. The method for transmitting and receiving an information signal of mobile unit according to claim 12, wherein, a mobile unit communication apparatus for transmitting and receiving an information signal is installed on a vehicle.

* * * * *

UNITED STATES PATENT AND TRADEMARK OFFICE
CERTIFICATE OF CORRECTION

PATENT NO.    : 6,647,268 B1
DATED         : November 11, 2003
INVENTOR(S)   : Hirotatsu Tshuchida et al.

It is certified that error appears in the above-identified patent and that said Letters Patent is hereby corrected as shown below:

Title page,
Item [56], References Cited, please add the following references to the listing under:

FOREIGN PATENT DOCUMENTS

-- JP    11083508    3/1999
   JP    5167525     7/1993 --

Signed and Sealed this

Twenty-fourth Day of August, 2004

JON W. DUDAS
*Director of the United States Patent and Trademark Office*